United States Patent
Shumura et al.

(10) Patent No.: US 6,738,330 B2
(45) Date of Patent: May 18, 2004

(54) OPTICAL INFORMATION REPRODUCING AND RECORDING APPARATUS UTILIZING VARYING TEMPERATURE SETTING RANGES

(75) Inventors: Yoji Shumura, Kawagoe (JP); Tomoko Miyagawa, Kawagoe (JP); Katsuaki Yamanoi, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 184 days.

(21) Appl. No.: 09/808,031

(22) Filed: Mar. 15, 2001

(65) Prior Publication Data

US 2001/0038587 A1 Nov. 8, 2001

(30) Foreign Application Priority Data

Mar. 15, 2000 (JP) ........................................ 2000-072580
Mar. 15, 2000 (JP) ........................................ 2000-072581

(51) Int. Cl.$^7$ .................................................. G11B 7/13
(52) U.S. Cl. ................................ 369/53.18; 369/53.26; 369/116; 369/120
(58) Field of Search .......................... 369/53.18, 53.26, 369/120, 116

(56) References Cited

U.S. PATENT DOCUMENTS

| | | | | |
|---|---|---|---|---|
| 5,191,362 A | * | 3/1993 | Ichikawa | 347/131 |
| 5,323,374 A | * | 6/1994 | Arai et al. | 369/116 |
| 5,461,603 A | * | 10/1995 | Otsuka | 369/120 |
| 5,594,748 A | * | 1/1997 | Jabr | 372/38 |
| 5,598,395 A | * | 1/1997 | Watanabe | 369/116 |
| 5,638,687 A | * | 6/1997 | Mizohata et al. | 62/62 |
| 5,825,723 A | * | 10/1998 | Hirokane et al. | 369/13 |
| 6,125,093 A | * | 9/2000 | Toda et al. | 369/116 |
| 6,414,806 B1 | * | 7/2002 | Gowda et al. | 360/25 |

* cited by examiner

*Primary Examiner*—Doris H. To
*Assistant Examiner*—Gautam R. Patel
(74) *Attorney, Agent, or Firm*—Sughrue Mion, PLLC

(57) ABSTRACT

A temperature inside the information reproducing and recording apparatus is always monitored and it is judged whether the temperatures is a proper operation start temperature, a stop temperature or a restart temperature or not. Based on this judgement, the start and the like of the reproducing and recording operation is properly controlled. Further, with respect to the reproducing and the recording of the information, their respective proper operation temperature ranges are set individually.

9 Claims, 5 Drawing Sheets

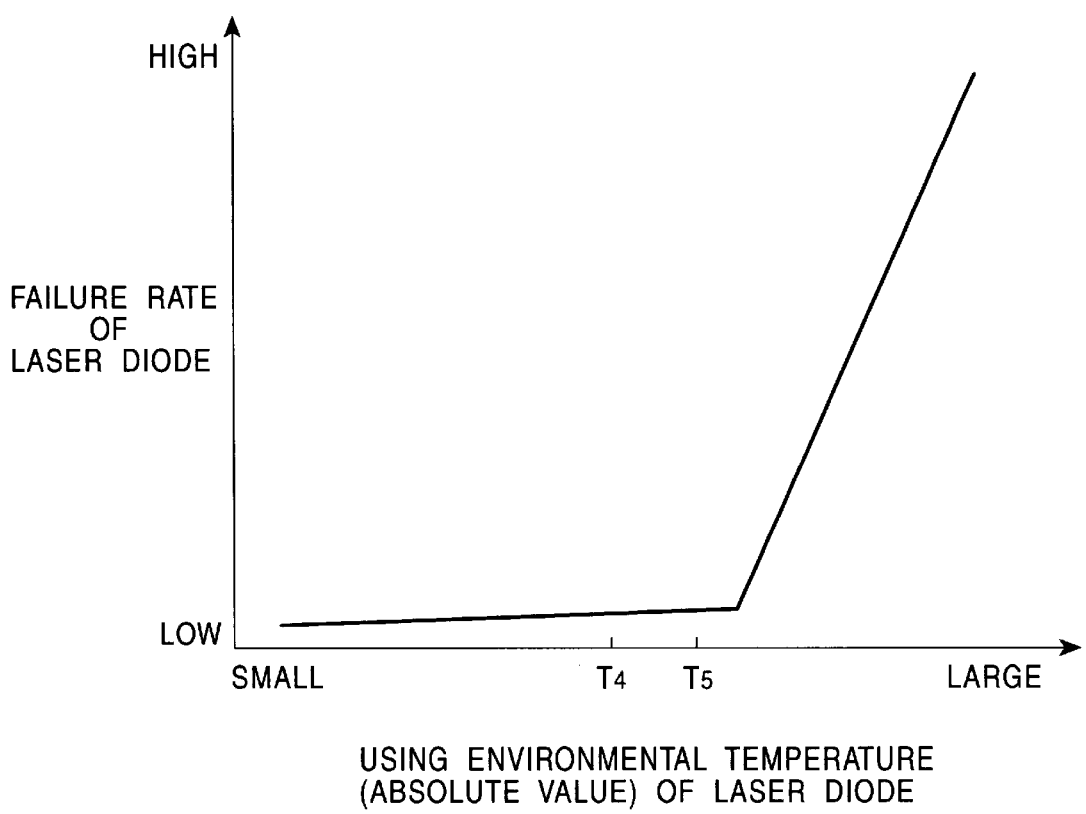

OPTICAL INFORMATION REPRODUCING AND RECORDING APPARATUS UTILIZING VARYING TEMPERATURE SETTING RANGES

BACKGROUND OF THE INVENTION

1. Field of the Invention

The present invention relates to an optical information reproducing and recording apparatus such as a CD player, an MD player mounted on a vehicle such as an automobile.

2. Description of the Related Art

An optical information reproducing and recording apparatus such as a CD player, an MD player mounted on a vehicle such as an automobile is exposed to a thermal environment which intensely changes by seasons or the weather. Accordingly, in general, a temperature sensor is mounted in the inside of the apparatus and when the temperature in the inside of the apparatus is abnormally elevated or lowered, the temperature sensor detects this phenomenon and automatically stops the operation of the apparatus thus preventing breakage and deterioration of quality of devices inside the apparatus due to the abnormal temperature.

In general, in an optical information reproducing apparatus such as a CD player which reproduces information recorded on an optical recording medium, laser beams are irradiated on a recording surface of a disc using optical reading means including a light source such as a laser diode which optically reads the recorded information and extracts modulated components contained in the reflected light so as to reproduce the recorded information.

However, because the laser diode which constitutes a light source is a semiconductor, there has been a problem that the laser diode breaks in a short time, when the laser diode is operated under a high temperature.

In view of the above, a conventional optical information reproducing apparatus adapts a constitution in which the temperature of the optical reading means is monitored and when the temperature exceeds a given temperature, the operation of the optical reading means is stopped. Under such a constitution, when the operation of the optical reading means is stopped and the temperature is lowered to a value below a given temperature, the operation will start again. However, due to a coupled effect of the heat generated by the re-operation and the preheat remaining in the apparatus, the temperature of the optical reading means exceeds the given temperature immediately after the operation so that the operation must be stopped again. Such starting and stopping operations are cumbersome.

On the other hand, since an optical information reproducing and recording apparatus such as an MD player performs not only the reproduction of the information but also the recording of the information and hence, it is necessary to drive a laser diode with a larger electric power at the time of recording compared with the electric power at the time of reproducing. The generation of heat of the optical reading means including the light source such as the laser diode largely differs between the time of recording and the time of reproducing. Accordingly, when an optical information reproducing and recording apparatus such as the MD player is mounted on a vehicle, in view of the severe change of environmental temperature derived from mounting of the apparatus on the vehicle and hence, a delicate temperature monitoring which considers the difference of heat generation between the time of recording information and the time of reproducing information becomes necessary.

An optical information reproducing and recording apparatus such as the MD player heats a magnetic film on the surface of a disc, which constitutes a recording medium, at a given temperature by the irradiation of laser beams from the laser diode and simultaneously writes information in the disc by applying a magnetic modulation to the above-mentioned magnetic film by means of an information recording magnetic head disposed adjacent to the disc.

In general, it has been known that when the laser diode is driven under the thermal environment of an excessively high temperature or an excessively low temperature, the quality of a semiconductor which constitutes the laser diode is deteriorated, thus remarkably shortening the lifetime thereof.

In view of the above, to prevent failures derived from the deterioration of the laser diode, the conventional vehicle-mounting-type information reproducing and recording apparatus detects the temperature of the apparatus, particularly the temperature in the vicinity of the laser diode and automatically stops the irradiation of laser beams, that is, the writing of the information when the temperature exceeds a given temperature range.

On the other hand, in an optical reproducing and recording apparatus such as the MD player, when information signal such as music is written in the disc, after the recording of the information signal is completed, a signal(hereinafter called "administration signal") which administrates the recording conditions such as playing time of the recorded music, the recording order in the disc, the recording area and address in the disc is recorded together with administration signal area on the disc. After recording the information signals, the information reproducing and recording apparatus performs the reproducing and the editing of the music recorded in the disc based on such administration signals. Accordingly, when the administration signals are not written due to some reasons, even when the information signals on the music are wholly accurately written, the reproducing and editing of the music recorded in the disc becomes impossible.

However, in the conventional vehicle-mounting-type information reproducing and recording apparatus, when the temperature in the inside of the apparatus deviates from a given usage temperature range in the midst of writing the music, the writing operation is instantly stopped and the disc is ejected from the apparatus housing so as to prevent the deterioration of the laser diode. Accordingly, the writing of the administration signals can not be performed so that the information signals recorded in the disc when the writing is stopped are wasted whereby the availability of the information recording and reproducing apparatus in operation is remarkably reduced.

OBJECTS AND SUMMARY OF THE INVENTION

It is an object of the present invention to provide an optical information reproducing and recording apparatus which can maintain the reliability of the apparatus even under the severe temperature change and is capable of performing proper operations.

According to the present invention, an optical information reproducing and recording apparatus which records information to a optical information recording medium and reproduces the recorded information includes first signal processing part which processes a input signal and generates a writing signal to the information recording medium, information writing part which writes the writing signal into the information recording medium, information reading part which reads information recorded in the information recording medium and generates a reading signal, second signal processing part which performs signal processing of the reading signal and generates an information reproducing signal, temperature detecting part which detects the temperature of the information writing part and the information reading part, control part which controls operations of the information writing part and the information reading part based on a detected value from the temperature detecting part, wherein the control part performs a control such that the control part allows the operation of the information writing part and the information reading part only when the detected value falls within a first temperature setting range, the control part stops the operation of the information writing part and information reading part when the detected value exceeds a second temperature setting range, and the control part allows the restarting of the operations of information writing part and the information reading part when the detected value falls within a third temperature setting range, and the first to third temperature setting ranges can be set individually with respect to respective operations of the information writing or the information reading.

Further, according to the present invention, an optical information reproducing and recording apparatus which records an information signal in an optical information recording medium together with a administration signal and reproduces the signals includes information writing and reading part which writes the information signal and the administration signal into the information recording medium or reads the written signals by irradiating optical beams to the information recording medium, temperature detecting part for detecting a temperature of the information writing and reading part, control part which controls the writing operation or the reading operation of the information writing and reading part in response to a writing or reading command and based on a detected value from the temperature detecting part, wherein the control part performs a control such that provided that the writing command is supplied to the control part, when the detected value is out of a given set temperature range, the control part stops the writing operation of the information signal and shifts the writing operation to only the writing operation of the administration signal.

BRIEF EXPLANATION OF THE DRAWINGS

FIG. 5 is a graph showing the relationship among an operation reference setting temperature range, a failure rate of a laser diode and a using environmental temperature in the apparatus shown in FIG. 1.

DETAILED DESCRIPTION OF THE PRESENT EMBODIMENTS

Figure 1:
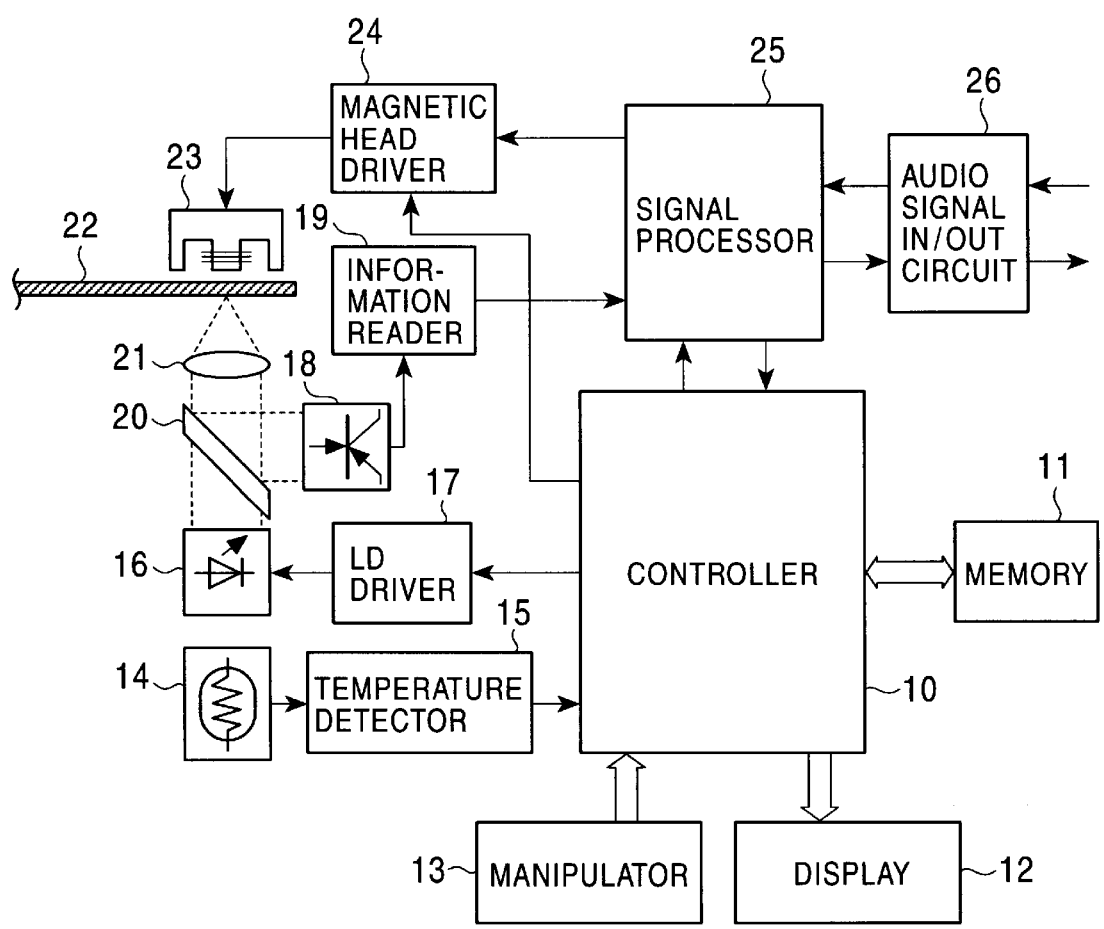
FIG. 1 is a bloc diagram showing a magnet-optic disc information reproducing and recording apparatus according to an embodiment of the present invention.

FIG. 1 shows a magnet-optic disc player according to an embodiment of the present invention.

As shown in FIG. 1, a controller 10 is mainly constituted by a microcomputer and is provided for controlling an operation of a whole apparatus. The controller 10 executes a main program (not explained here) stored in a memory 11 step by step in synchronous with a built-in clock. Here, at a ROM (Read Only Memory) table portion of the memory 11, respective values of operation reference temperature ranges T1, T2, T3, T1', T2', T3' which will be explained later are set.

A display 12 and a manipulator 13 are mounted on a console panel which is served for allowing the handling of the apparatus by a user. The display 12 is comprised of a liquid crystal panel and light emitting diodes which display the state of the apparatus, and the manipulator 13 is constituted by a keyboard or a group of switches for inputting commands of operation modes such as an information reproducing mode and an information recording mode.

A temperature sensor 14 is constituted by a temperature detection semiconductor such as a thermistor or a diode and, detects a temperature of optical reading part (not shown in the drawing) constituted by a laser diode 16 and a photodetector 18, particularly a temperature in the vicinity of the laser diode 16. Further, a temperature detector 15 detects the change of a resistance value or a voltage/current value of the temperature sensor 14 which brings about the temperature change and converts this to a temperature detected value made of a digital value and supplies this temperature detected value to the controller 10.

The laser diode 16 is excited by an output current of a laser diode driver (hereinafter described "LD driver")17 and irradiates laser beams. After passing through a beam splitter 20, the laser beams are converged by a focusing lens 21 and forms a beam spot on a surface of a magnet-optic disc 22. Further, a reflection light from the disc surface is reflected on the beam splitter 20 and is incident on the light receiving part constituted by a light receiving element such as a photo transistor, a photo diode and is converted into a electric signal as reproducing signal of information recorded in a disc. After being subjected to a processing such as a demodulation and a digital/analog conversion by an information reader 19 and a signal processor 25, such signal is converted to an audio signal such as music and is outputted to a speaker from an audio signal in/out circuit 26 through an amplifier circuit (not shown in the drawing).

On the other hand, an audio input signal from the outside is supplied to the signal processor 25 through the audio signal in/out circuit 26. The signal processor 25 performs a processing such as an analog/digital conversion, a coding and the like to the audio inputting signal and a formatting of the audio inputting signal into recording signal to the disc and supplies this recording signal to a magnetic head driver 24. The magnetic head driver 24 generates a magnetic head drive current in response to the supplied recording signal. By exciting a recording magnetic head 23 with such a magnetic head drive current, a magnetic film of the magnet-optic disc 22 is magnetized so that the information is recorded in the disc 22.

Here, in view of the characteristics of the magnet-optic disc, at the time of recording information to the disc, the controller 10 starts the operation of the LD driver 17 so as to excite the laser diode 16 at a high output and makes a recording spot on the surface of the magnet-optic disc 22 have a high temperature not less than the Curie point.

The manner of operation in an information reproducing mode of the apparatus shown in FIG. 1 is explained hereinafter.

Figure 2:
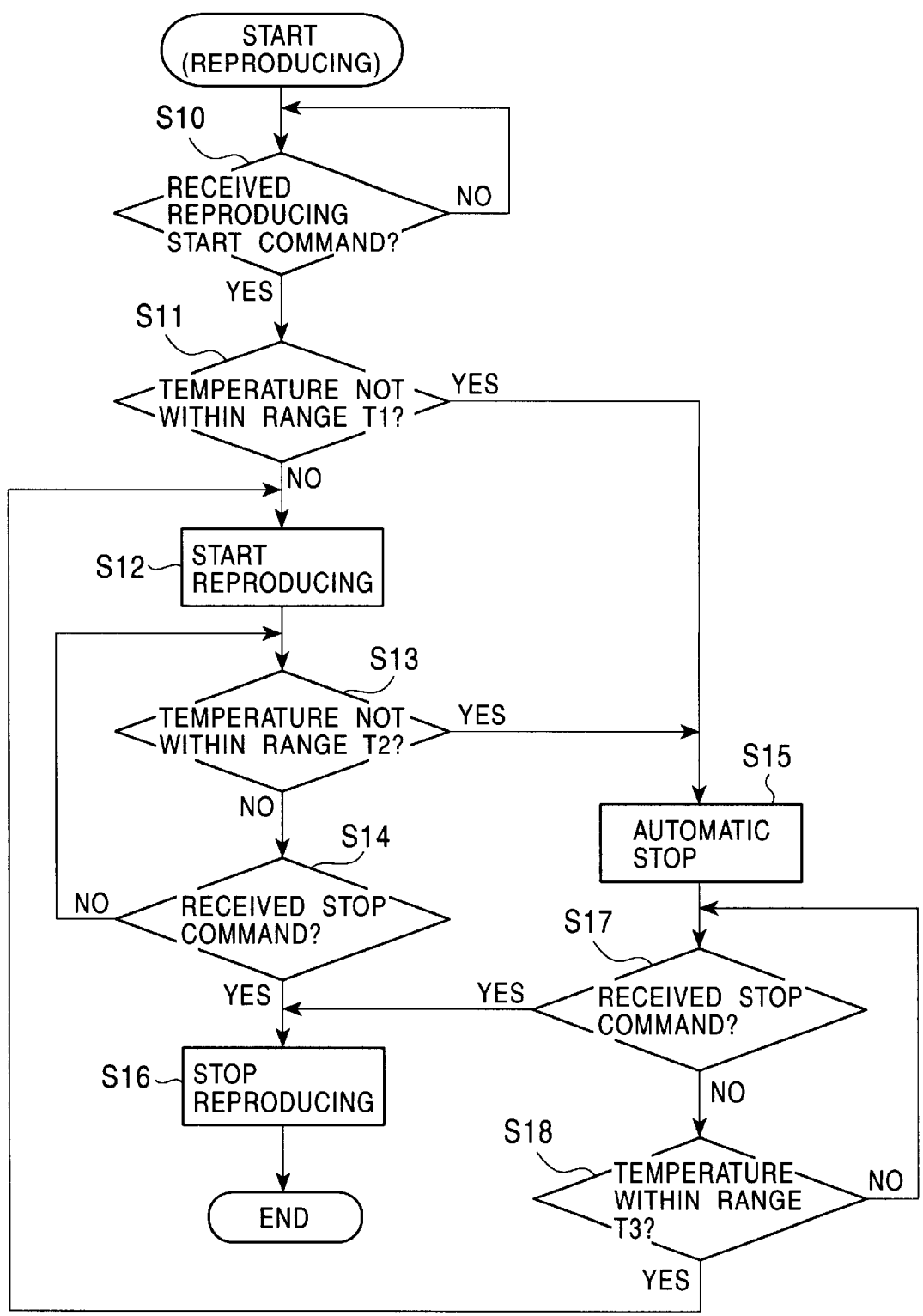
FIG. 2 is a flow chart showing an operation of the apparatus shown in FIG. 1 in an information reproducing mode.

The controller 10 executes sub routine of the information reproducing mode shown in FIG. 2, for example, interrupting into a main routine which is always executed in synchronous with a built-in clock, at a given interval.

In accordance with the sub routine, the controller 10 always monitors whether a reproducing start command is delivered from the manipulator 13 or not (step 10). When the user performs the manipulation of reproducing starting at the manipulator 13, the reproducing start command is supplied from the manipulator 13. In response to this reproducing start command, the controller 10 takes in a temperature detected value of the optical reading means (not shown in the drawing) including the laser diode 16 from the temperature detector 15 and judges whether the value falls within a range of the reproducing start temperature range T1 which is preset in the ROM table of the memory 11 or not (step 11).

If the temperature detected value falls within the range T1, the controller 10 starts the reproducing operation (step 12). That is, the controller 10 drives the magnet-optic disc 22 and the optical reading means (not shown in the drawing) including the laser diode 16 by means of a spindle motor and a servo mechanism (not shown in the drawing) and irradiates laser beams from the laser diode 16 to the information recording surface of the disc 22. Upon reflection of the laser beams on the magnetic film of the information recording surface, the laser beam receives a polarization corresponding to the magnetizing direction of the magnetic film due to a so-called "Kerr effect". By detecting the polarization of the reflection beams and performing the demodulation processing at the photodetector 18 and the information reader 19, the demodulation and reproducing of the information recorded in the disc 22 is performed.

During a period that the apparatus performs the processing operation of the reproducing mode, the controller 10 periodically monitors an output of the temperature detector 15 and judges whether the temperature detected value falls within the reproducing tolerance temperature range T2 set in the ROM table of the memory 11 or not (step 13). If the temperature detected value falls within the range T2, the controller 10 monitors whether the controller 10 has received a reproducing stop command from the manipulator 13 or not (step 14). If the controller 10 has not received the stop command, the controller 10 returns to step 13 and repeats the above-mentioned monitoring procedure. If the controller 10 has received the stop command, the controller 10 stops the reproducing operation of the information recorded in the disc 22 and ejects the disc 22 (step 16).

If the temperature detected value exceeds the reproducing start temperature range T1 at step 11 and exceeds the reproducing tolerance temperature range T2 at step 13, the controller 10 performs an alarm display at the display 12 that the thermal environment of the apparatus is abnormal and hence, the reproducing operation is impossible and then automatically stops the reproducing operation (step 15). After stopping the reproducing operation, the controller 10 monitors whether the controller 10 has received the reproducing stop command from the manipulator 13 or not (step 17). If the controller 10 has received the stop command, the controller 10 resets the above-mentioned alarm display and advances the processing to step 16 and stops the reproducing operation and ejects the disc 22. If the system control 10 has not received the stop command, the temperature detected value is again inputted to the controller 10 from the temperature detector 15 and the controller 10 judges whether the value falls within the reproducing restart temperature range T3 which is preset at the ROM table or not (step 18). If the temperature detected value does not fall within the reproducing restart temperature range T3, the controller 10 returns the processing to step 17 and repeats above-mentioned monitoring procedure and if the detected value falls within the reproducing restart temperature range T3, the controller 10 resets the above-mentioned alarm display and returns the procedure to step 12 and restarts the reproducing operation.

The relationship among respective temperature ranges, that is, the relationship among the reproducing start temperature range T1, the reproducing tolerance temperature range T2, and the reproducing restart temperature range T3 is determined such that the temperature range T3 is included in the temperature range T1 and the temperature range T1 is included in the temperature range T2.

That is, to restart the reproducing operation after the temperature of the optical reading means (not shown in the drawing) including the laser diode 16 is elevated and exceeds the reproducing tolerance temperature range T2 and hence the reproducing operation is stopped, the temperature must be lowered to fall within the reproducing restart temperature range T3 which has a narrower range than reproducing start temperature range T1. In the same manner, when the temperature of the optical reading means is lowered due to the lowering of the environmental temperature, to restart the reproducing operation after the temperature exceeds the reproducing tolerance temperature range T2 and hence the reproducing operation is stopped, the temperature must fall within the reproducing restart temperature range T3 having a narrower range than the reproducing start temperature range T1.

Accordingly, compared to a case in which the operation restarting is judged using only the reproducing start temperature range T1 as the reference, a so-called "hunting phenomenon" in which the optical reading means repeats the re-operation and the re-stopping due to the temperature change immediately after the restarting of the operation can be obviated.

Subsequently, the manner of a processing operation in the information recording mode is explained hereinafter.

Figure 3:
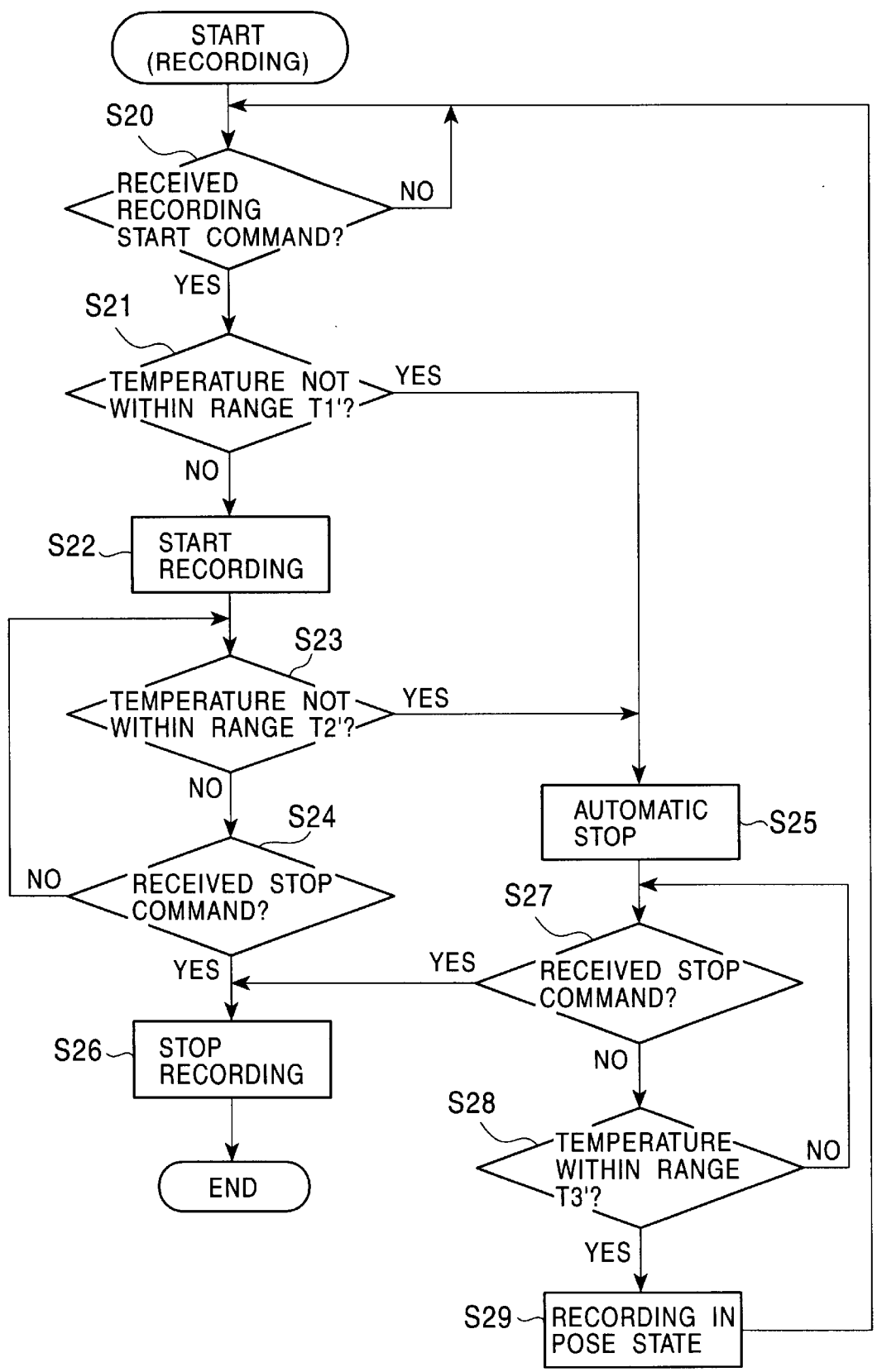
FIG. 3 is a flow chart showing an operation of the apparatus shown in FIG. 1 in an information recording mode.

The controller 10 makes a processing sub routine of the information recording mode shown in FIG. 3 interrupt the main routine executed in synchronous with the built-in clock and executes the sub routine at a given interval.

In accordance with the sub routine, the controller 10 always monitors whether the controller 10 has received a recording start command from the manipulator 13 or not (step 20). When the user performs the manipulation of the recording starting, the recording start command is supplied from the manipulator 13. In response to this recording start command, the controller 10 takes in the temperature detected value of the optical reading means (not shown in the drawing) including the laser diode 16 from the temperature detector 15. Then, the controller 10 judges whether this value falls within a recording start temperature range T1' preset in the ROM table of the memory 11 or not (step 21).

If the temperature detected value falls within the range T1', the controller 10 starts the recording operation (step 22). That is, the controller 10 drives the magnet-optic disc 22 and the optical reading means (not shown in the drawing) including the laser diode 16 by means of the spindle motor and the servo mechanism (not shown in the drawing) disposed in the inside of the apparatus. Further, the controller 10 excites the laser diode 16 through the LD driver 17 so as to irradiate laser beams of a high output to a recording surface of the disc 22. The magnetic film on the disc recording surface is heated by laser beams at a high temperature not less than the Curie point and is demagnetized and thereafter is magnetized again by a magnetic field of the magnetic head 23 excited by information recording signals from the magnetic head driver 24. Accordingly, the information to be recorded is recorded on the magnetic film of the disc 22.

During a period that the apparatus is performing the recording operation, the controller 10 periodically monitors the output of the temperature detector 15 and judges whether the temperature detected value falls within the recording tolerance temperature range T2' set in the ROM table of the memory 11 or not (step 23). If the temperature detected value falls within the range T2', the controller 10 monitors whether the controller 10 has received the recording stop command from the manipulator 13 or not (step 24). If the controller 10 has not received the stop command, the controller 10 returns to step 23 and repeats the above-mentioned monitoring procedure. If the system control part has received the stop command, the controller 10 stops the recording operation of the information to the disc 22 and ejects the disc 22 (step 26).

When the temperature detected value exceeds the recording start temperature range T1' at step 21 and exceeds the recording tolerance temperature range T2' at step 23, the controller 10 performs an alarm display at the display 12 that the thermal environment of the apparatus is abnormal and hence, the recording operation is impossible and automatically stops the recording operation (step 25). After stopping the recording operation, the controller 10 monitors whether the controller 10 has received the recording stop command from the manipulator 13 or not (Step 27). If the controller 10 has received the stop command, the controller 10 resets the above-mentioned alarm display and advances the processing to step 26 and stops the recording operation and ejects the disc 22.

If the controller 10 has not received the stop command, the controller 10 again inputs the temperature detected value from the temperature detector 15 and judges whether the value falls within the recording restarting temperature range T3' preset in the ROM table or not (step 28). If the temperature detected value does not fall within the range T3', the controller 10 returns the processing to step 27 and repeats the above-mentioned monitoring procedure. If the temperature detected value falls within the range T3', the controller 10 resets the above-mentioned alarm display and advances the processing to step 29 and makes the processing stand by for a fixed time in a so-called pose state and thereafter returns the processing to step 20 which is a starting point of the information recording mode.

The relationship among respective temperature range, that is, the relationship among the recording start temperature range T1', the recording tolerance temperature range T2', and the recording restart temperature range T3', is determined such that the temperature range T3' is included in the temperature range T1' and the temperature range T1' is included in the temperature range T2'.

That is, when the temperature of the optical reading means (not shown in the drawing) including the laser diode 16 is elevated and exceeds the recording tolerance temperature range T2', the recording operation is stopped. In such a case, to restart the operation thereafter, the temperature must be lowered to fall within the recording restart temperature range T3' having a narrower range than the recording start temperature range T1'. In the same manner, when the temperature of the optical reading means is lowered due to the lowering of the environmental temperature, to restart the operation after the temperature exceeds the recording tolerance temperature range T2' and hence the recording operation is stopped, the temperature must fall within the recording restart temperature range T3' having a narrower range than the recording start temperature range T1'.

Accordingly, compared to a case in which the operation restarting is judged using only the recording start temperature range T1' as the reference, a so-called "hunting phenomenon" in which the re-operation and the re-stopping are repeated due to the temperature change immediately after the restarting of the operation can be obviated.

Further, according to the present invention, respective temperature ranges are determined taking into account that the manner of temperature elevation of the optical reading means including the laser diode differs depending on the difference of excitation electric power of the laser diode between the information reproducing mode and the information recording mode. To be more specific, the relationship among the temperature ranges is determined such that the recording start temperature range T1' is included in the reproducing start temperature range T1, the recording tolerance temperature range T2' is included in the reproducing tolerance temperature range T2 and the recording restart temperature range T3' is included in the reproducing restart temperature range T3.

That is, in the information reproducing mode using a small excitation electric power of the laser diode, large temperature ranges are set in all of the start, the tolerance and the restart of the operation compared to the information recording mode using a large excitation electric power.

In this manner, according to the present invention, while properly administrating the operation environment of the laser diode which is used at the time of recording or reproducing information, it becomes possible to execute only the reproducing processing even under the thermal environment in which the recording processing of information cannot be executed.

Subsequently, the second embodiment of the present invention is explained hereinafter.

The second embodiment is directed to a writing processing of an information signal and a administration signal which takes into account the environment temperature of the apparatus in the information recording mode.

The second embodiment can be also realized by an apparatus constitution similar to the apparatus constitution shown in the block diagram of FIG. 1. However, it is assumed that an operation program relating to the second embodiment is stored in the memory 11 shown in FIG. 1. It is also assumed that respective values of operation reference temperature ranges T4 and T5 which will be explained later are preset in the ROM table of the memory 11.

In the block diagram shown in FIG. 1, a laser diode 16 is excited at a high output using an output current of a laser diode drive part (hereinafter described as "LD drive part") 17 and irradiates laser beams onto a recording surface of a magnet-optic disc 22. The laser beams are converged by a focusing lens 21 and forms a beam spot on a magnetic film on the recording surface of the disc 22 and heats the spot at a temperature not less than the Curie point. Accordingly, the magnetization of the spot portion is dissipated and hence, the demagnetization ready for a new writing of information is completed.

On the other hand, an audio input signal such as music is supplied to a signal processor 25 through an audio signal in/out circuit 26 which controls the interface with external apparatuses and the adjustment of input signal levels. The signal processor 25 performs a processing such as an analog/digital conversion, a coding and the like to an output of the audio signal in/out circuit 26 and a formatting of such an output into writing signals to the magnet-optic disc and supplies these writing signals to a magnetic head driver 24.

The magnetic head driver 24 generates a magnetic head drive current in response to the supplied writing signals and a coil of a recording magnetic head 23 is excited with such a magnetic head drive current. That is, a magnetic field generated by the magnetic head 23 receives the modulation due to the audio input signal. Due to such a magnetic field, the spot on the magnetic film where the above-mentioned demagnetization is completed is magnetized again, and the audio input signal such as music is written in the disc 22 as the information signal.

Further, upon completion of the writing of the information signal such as music, the controller 10 prepares a administration signal indicative of writing conditions such as a recording time of information signal, a recording area address on the disc and the like, formats the administration signal into writing signal to the disc and supplies the writing signal to the head drive part 24.

In accordance with a procedure similar to the procedure of the above-mentioned writing of information signal, the controller 10 drives the disc 22, optical writing means including the laser diode 16 and the magnetic head portion 23 so as to write the above-mentioned administration signal to an administration signal area of the disc 22.

The processing based on the second embodiment is explained in a further specific manner.

Figure 4:
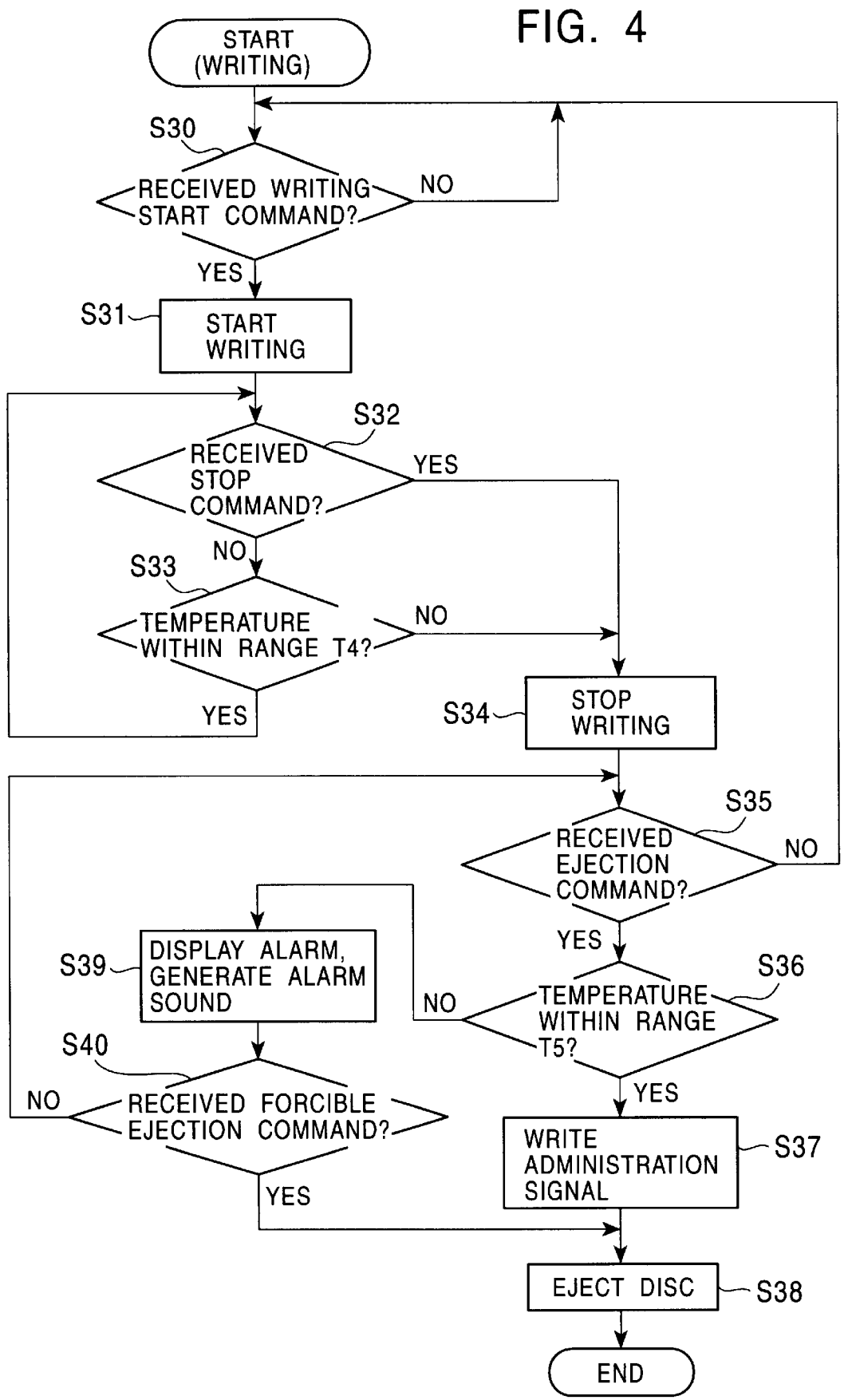
FIG. 4 is a flow chart showing an operation of the apparatus shown in FIG. 1 in an information signal and administration signal writing mode.

The controller 10 makes a processing sub routine of an information writing mode shown in FIG. 4 interrupt a main routine which is executed in synchronous with a built-in clock, then the controller 10 executes the sub routine at a given interval.

In accordance with the sub routine, the controller 10 always monitors whether the controller 10 has received a writing start command from a manipulator 13 or not (step 30). When a user performs a writing start manipulation, the writing start command is supplied to the controller 10 from the manipulator 13 and the controller 10 starts the writing processing of information in response to the writing start command (step 31). That is, the controller 10 drives the magnet-optic disc 22 and the optical writing means (not shown in the drawing) including the laser diode 16 by the spindle motor and the servo mechanism (not shown in the drawing) inside the apparatus. Further, the controller 10 excites the laser diode 16 through the LD driver 17 so as to irradiate laser beams of a high output to the recording surface of the disc 22. The magnetic film on the disc recording surface is heated by laser beams at a high temperature not less than the Curie point and is demagnetized and thereafter is magnetized again by the magnetic field of the magnetic head 23 excited by information signal writing signals from the magnetic head driver 24. Accordingly, the input audio signal such as music is recorded on the magnetic film of the disc 22 as information signal.

After the apparatus has started the writing processing, the controller 10 always monitors whether the controller 10 has received a writing stop command from the manipulator 13 or not (step 32) and if the controller 10 has not received the writing stop command, the processing is advanced to step 33. The controller 10 takes in an output of the temperature detector 15 in step 33 and judges whether the temperature detected value falls within an information signal writing allowable temperature range T4 preset in the ROM table of the memory 11 or not. If the temperature detected value falls within the temperature range T4, the controller 10 returns the processing to the step 32 and repeats the above-mentioned monitoring procedure.

If the controller 10 has received the writing stop command in step 32 or the temperature detected value has exceeded the temperature range T4 in step 33, the controller 10 stops the writing operation (step 34). If the writing operation is stopped in step 33, the controller 10 performs an alarm display in a display 12 to inform the user that the thermal environment of the apparatus is abnormal and hence, the writing is impossible.

The controller 10, after stopping the writing operation in step 34, monitors whether the controller 10 has received an ejection command indicative of discharging the disc from the inside of the apparatus from the manipulator 13 or not (step 35). If the controller 10 has not received the ejection command, the controller 10 returns the processing to the initial step (step 30) of the writing operation sub routine. If the controller 10 has received the ejection command of the disc in step 35, the controller 10 again takes in an output of the temperature detector 15 and judges whether the temperature detected value falls within an administration signal writing allowable temperature range T5 preset in the ROM table of the memory 11 or not (step 36).

If the detected value falls within the temperature range T5, the controller 10 prepares an administration signal indicative of writing conditions such as an address on the disc in which information signal which is written in the disc 22 before the writing operation is stopped in the above-mentioned step 34 are recorded. Then, after performing a formatting of the administration signal, the controller 10 supplies the administration signal to the head drive part 21. In accordance with a procedure similar to the procedure at the time of writing the above-mentioned information signal, the controller 10 writes the above-mentioned administration signal into an administration signal recording area of the disc 22 (step 37).

In this manner, according to the present invention, even when the writing operation is finished by interruption due to the abnormality of the environmental temperature of the apparatus, with respect to the information signal which are recorded before the writing operation is stopped, the administration signal are generated and are written in the administration signal area on the disc in the similar manner as the case in which the writing operation is normally finished. Accordingly, even after the apparatus is restored to a normal state, the information signal recorded before the operation is stopped effectively remains and hence, the reproducing and the editing of the information signal become possible.

The controller 10, after writing the above-mentioned administration signal to the disc, ejects the disc 22 from the inside of the apparatus housing and completes the writing operation by resetting all alarm outputs (step 38).

On the other hand, if the temperature detected value does not fall within the temperature range T5, the controller 10 performs an alarm display on the display 12 to alarm a user that the temperature in the inside of the apparatus is too abnormal to allow the writing of even the above-mentioned administration signal. Further, the controller 10 drives an alarm sound generating apparatus (not shown in the drawing) to call for the attention of the user (step 39).

After outputting such an alarm, the controller 10 judges whether a forcible ejection command indicative of the prompt discharging of the disc from the inside of the apparatus housing is outputted from the manipulator 13 or not (step 40). If the forcible ejection command is outputted, the controller 10 allows the processing to advance to step 38 and performs the ejection of the disc from the apparatus housing and completes the writing operation after resetting the alarm output. Further, if the forcible ejection command is not outputted, the controller 10 does not perform the ejection of the disc and returns the processing to step 35 and repeats the monitoring processing whether the controller 10 has received the ejection command or not.

In general, it has been known that, with respect to the relationship between the failure rate of the laser diode and the using environment temperature, there exists a tendency that corresponding to the elevation of the temperature, the failure rate is gradually increased and then is sharply increased from a fixed temperature as a boundary. Further, it has been also known that, under the same environment, the shorter the operation time of the laser diode, the failure rate can be suppressed to a lower value.

According to the present invention, with respect to the relationship between the failure rate of the laser diode and the using environmental temperature, the values of the information signal writing allowable temperature range T4 and the administration signal writing allowable temperature range T5 are determined as shown in FIG. 5. That is, even when the ambient temperature of the optical writing means including the laser diode 16 exceeds the temperature range T4, so long as the ambient temperature falls within the temperature range T5, there is no fear that the quality of the laser diode is rapidly deteriorated. According to the present invention, before the ambient temperature exceeds the temperature range T5, the administration signal related with the information signal written in the disc by that time is rapidly written in the administration signal area of the disc.

Further, since an information quantity of the administration signal is extremely small compared with the information signal, time necessary for performing the writing processing of the information is extremely short. Even when the laser diode operation is performed under such a thermal environment, no problem arises provided that the operation time is short.

It is understood that the foregoing description and accompanying drawings set forth the preferred embodiments of the invention at the present time. Various modification, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An optical information reproducing apparatus which reproduces information recorded in an optical information recording medium comprising an information reading part which reads the information recorded in said information recording medium and generates a reading signal, a signal processing part which performs signal processing of said reading signals and generates an information reproducing signal, a temperature detecting part which detects a temperature of said information reading part, and a control part which controls an information reading operation of said information reading part in response to a detected value from said temperature detecting part, wherein said control part performs a control so that said control part allows the reading operation of said information reading part only when said detected value falls within a first temperature setting range, said control part stops the reading operation of said information reading part when said detected value exceeds a second temperature setting range, and said control part allows a restarting of the reading operation of said information reading part when said detected value falls within a third temperature setting range, wherein said first temperature setting range is wider than said third temperature setting range and includes said third temperature setting range therein, and said second temperature setting range is wider than said first temperature setting range and includes said first temperature setting range therein.

2. An optical information recording apparatus which records information in an optical information recording medium comprising a signal processing part which performs signal processing of an input signal and generates a writing signal to said recording medium, an information writing part which writes said writing signals to said information recording medium, a temperature detecting part which detects a temperature of said information writing part, and a control part which controls information writing operation of said information writing part in response to a detected value from said temperature detecting part, wherein said control part performs a control such that information writing part only when said detected value falls within a first temperature setting range, said control part stops the writing operation of said information writing part when said detected value exceeds a second temperature setting range, and said control part allows a restarting of the writing operation of said information writing part when said detected value falls within a third temperature setting range, wherein said first temperature setting range is wider than said third temperature setting range and includes said third temperature setting range therein, and said second temperature setting range is wider than said first temperature setting range and includes said first temperature setting range therein.

3. An optical information reproducing and recording apparatus which records information to an optical information recording medium and reproduces the recorded information comprising a first signal processing part which processes an input signal and generates a writing signal to said information recording medium, an information writing part which writes said writing signals into said information recording medium, an information reading part which reads information recorded in said information recording medium and generates a reading signal, a second signal processing part which performs signal processing of said reading signal and generates an information reproducing signal, a temperature detecting part which detects a temperature of said information writing part and said information reading part, and a control part which controls operations of said information writing part and said information reading part based on a detected value from said temperature detecting part, wherein said control part performs a control such that said control part allows the operation of said information writing part and said information reading part only when said detected value falls within a first temperature setting range, said control part stops the operation of said information writing part and said information reading part when said detected value exceeds a second temperature setting range, and said control part allows a restarting of the operations of said information writing part and said information reading part when said detected value falls within a third temperature setting range, wherein said first temperature setting range is wider than said third temperature setting range and includes said third temperature setting range therein, and said second temperature setting range is wider than said first temperature setting range and includes said first temperature setting range therein.

4. An optical information reproducing and recording apparatus according to claim 3, wherein with respect to said first to third temperature ranges, an information writing operation and an information reading operation are respectively capable of individually setting said temperature ranges.

5. An optical information reproducing apparatus which reproduces information recorded in an optical information recording medium comprising:

an information reading part which reads the information recorded in said information recording medium and generates a reading signal, a signal processing part which performs signal processing of said reading signal and generates an information reproducing signal, a temperature detecting part which detects a temperature of said information reading part, and a control part which controls an information reading operation of said information reading part in response to a detected value from said temperature detecting part, wherein said control part performs such a control that said control part allows the reading operation of said information reading part only when said detected value falls within a first temperature setting range defined by a first upper temperature limit, said control part stops the reading operation of said information reading part when said detected value exceeds a second temperature setting range defined by a second upper temperature limit higher than said first upper temperature limit, and said control part allows a restarting of the reading operation of said information reading part when said detected value falls within a third temperature setting range defined by a third upper temperature limit lower than said first upper temperature limit.

6. An optical information recording apparatus which records information in an optical information recording medium comprising:

a signal processing part which performs signal processing of an input signal and generates a writing signal to said recording medium, an information writing part which writes said writing signals to said information recording medium, a temperature detecting part which detects a temperature of said information writing part, and a control part which controls information writing operation of said information writing part in response to a detected value from said temperature detecting part, wherein said control part performs such a control that information writing part only when said detected value falls within a first temperature setting range defined by a first upper temperature limit, said control part stops the writing operation of said information writing part when said detected value exceeds a second temperature setting range defined by a second upper temperature limit higher than said first upper temperature limit, and said control part allows a restarting of the writing operation of said information writing part when said detected value falls within a third temperature setting range defined by a third upper temperature limit lower than said first upper temperature limit.

7. An optical information reproducing and recording apparatus which records information to an optical information recording medium and reproduces the recorded information comprising:

a first signal processing part which processes an input signal and generates a writing signal to said information recording medium, an information writing part which writes said writing signals into said information recording medium, an information reading part which reads information recorded in said information recording medium and generates a reading signal, a second signal processing part which performs signal processing of said reading signal and generates an information reproducing signal, a temperature detecting part which detects a temperature of said information writing part and said information reading part, and a control part which controls operations of said information writing part and said information reading part based on a detected value from said temperature detecting part, wherein said control part performs such a control that said control part allows the operation of said information writing part and said information reading part only when said detected value falls within a first temperature setting range defined by a first upper temperature limit, said control part stops the operation of said information writing part and said information reading part when said detected value exceeds a second temperature setting range defined by a second upper temperature limit higher than said first upper temperature limit, and said control part allows a restarting of the operations of said information writing part and said information reading part when said detected value falls within a third temperature setting range defined by a third upper temperature limit lower than said first upper temperature limit.

8. An optical information reproducing and recording apparatus which records an information signal in an optical information recording medium together with a administration signal and reproduces said signal comprising:

an information writing and reading part which writes said information signal and said administration signal into said information recording medium or reads written signals by irradiating optical beams to said information recording medium, a temperature detecting part for detecting a temperature of said information writing and reading part, a control part which controls the writing operation or the reading operation of said information writing and reading part in response to a writing or reading command and based on a detected value from said temperature detecting part, wherein, said control part performs such a control that said control part stops the writing operation of said information signal and shifts to a writing operation of said administration signal when said detected value is out of a first temperature setting range defined by a first upper temperature limit upon receiving said writing command, and said control part stops the writing operation of said administration signal when said detected value exceeds a second temperature setting range defined by a second upper temperature limit higher than said first upper temperature limit.

9. An optical information reproducing and recording apparatus according to claim 8, wherein said second temperature setting range is wider than said first temperature setting range and includes said first temperature setting range therein.

* * * * *

UNITED STATES PATENT AND TRADEMARK OFFICE
CERTIFICATE OF CORRECTION

PATENT NO.    : 6,738,330 B2
DATED         : May 18, 2004
INVENTOR(S)   : Yoji Shumura, Tomoko Miyagawa and Katsuaki Yamanoi It is certified that error appears in the above-identified patent and that said Letters Patent is hereby corrected as shown below:

Column 12,
Line 28, after "that", please insert, -- said control part allows the writing operation of said --.

Column 13,
Line 65, after "that", please insert, -- said control part allows the writing operation of said --.

Signed and Sealed this

Twenty-first Day of September, 2004

JON W. DUDAS
*Director of the United States Patent and Trademark Office*